C. S. CORKHILL.
CULTIVATOR.
APPLICATION FILED AUG. 20, 1913.
1,103,350.
Patented July 14, 1914.
2 SHEETS—SHEET 1.
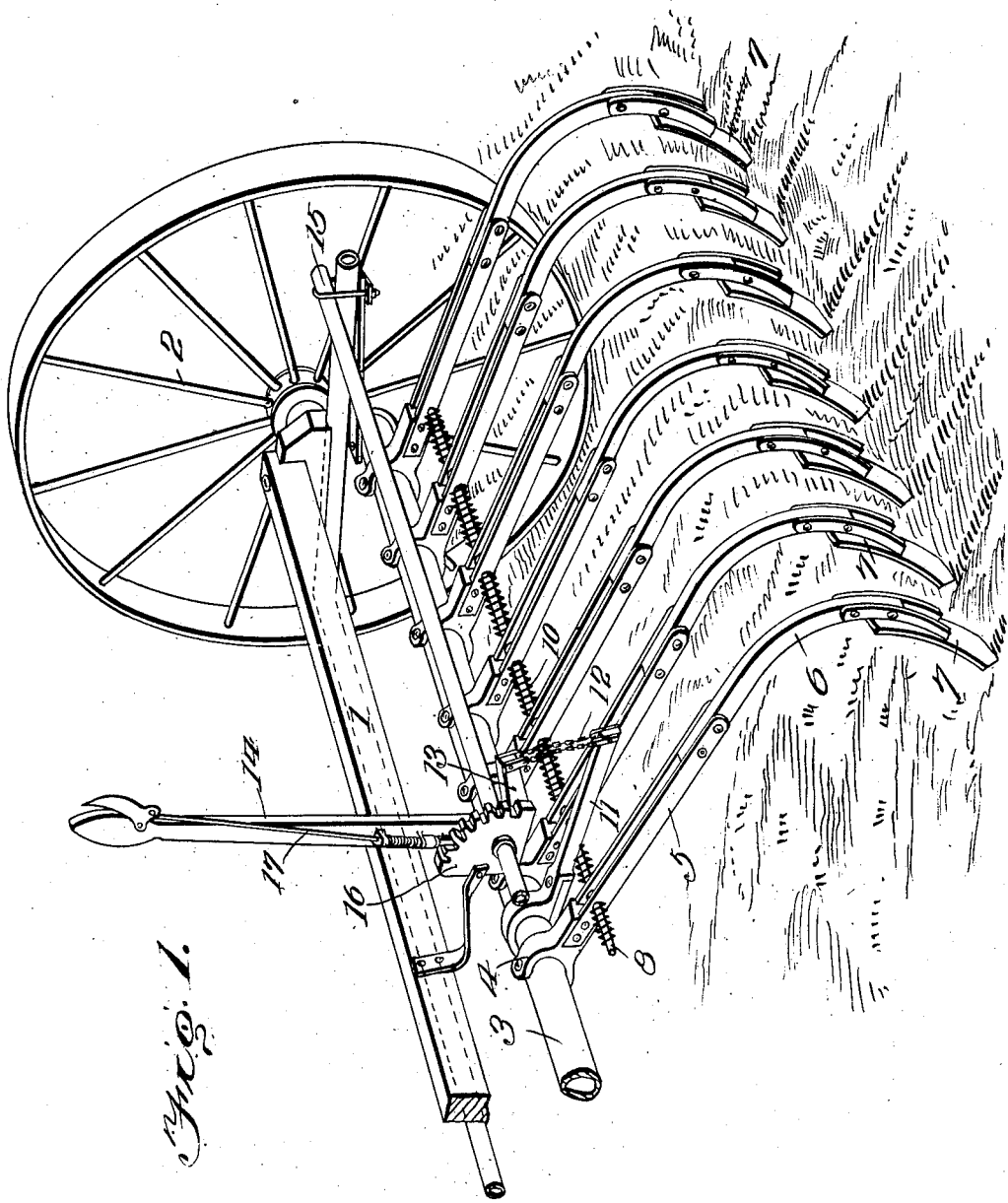
Witnesses
Inventor
C. S. Corkhill,
By
Attorneys

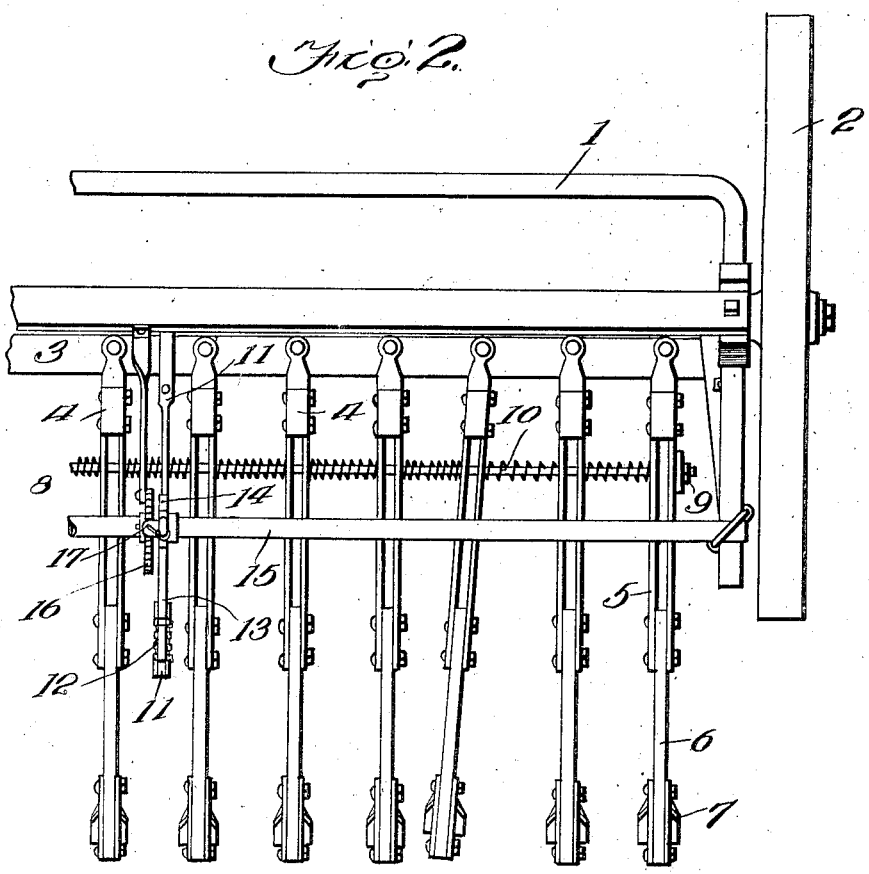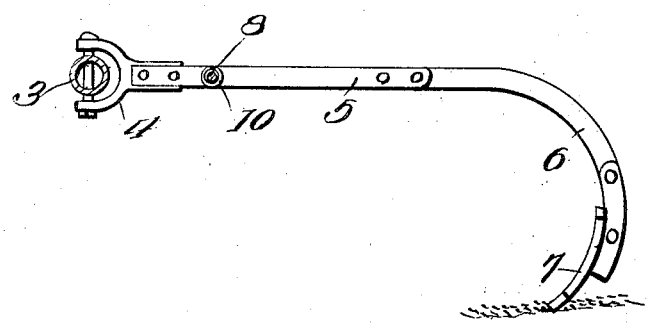

UNITED STATES PATENT OFFICE.

CHARLES S. CORKHILL, OF ONTARIO, CALIFORNIA.

CULTIVATOR.

1,103,350.   Specification of Letters Patent.   Patented July 14, 1914.

Application filed August 20, 1913. Serial No. 785,751.

*To all whom it may concern:*

Be it known that I, CHARLES S. CORKHILL, a citizen of the United States, residing at Ontario, in the county of San Bernardino and State of California, have invented certain new and useful Improvements in Cultivators, of which the following is a specification.

This invention relates to cultivators, and its primary object is to provide a cultivator the teeth of which will be permitted to shift laterally automatically so that the dirt will be thrown up to and around the roots of the plants, and injury to the plants will be avoided.

The invention also seeks to provide a cultivator in which a gang of teeth will be so mounted as to have independent lateral movement and means will be provided to hold the teeth yieldably in the normal position.

Other incidental objects will appear as the description proceeds, and the invention consists in certain novel features which will be pointed out in the claims following the detailed description.

The invention is fully illustrated in the accompanying drawings, in which:

Figure 1 is a perspective view of a portion of a cultivator embodying my present invention; Fig. 2 is a plan view of the same; Fig. 3 is a detail side elevation of one of the cultivator beams with its attached tooth or shovel.

In carrying out my invention, I employ a frame 1 which may be of any preferred construction and is mounted upon wheels, one of which is shown at 2, so that it may be readily drawn over the field. The particular form of this wheel-supported frame is immaterial and forms no part of my invention and the illustration of the same is somewhat conventional and intended merely to more clearly disclose the operation of my improvements. Mounted upon this frame in any convenient manner is a rocking rod or shaft 3 which constitutes the cultivator head, and pivoted to the said shaft or rod are a series of yokes or couplings 4 which may have movement laterally or in a horizontal plane independently of the shaft but can have no vertical movement except when the shaft is rocked. To each coupling or yoke 4 is secured a cultivator beam 5 having a standard 6 secured to and depending from its rear end, and to the said standard is secured a tooth or shovel 7 of any preferred design. Disposed transversely to and extending through the gang of cultivator beams is a stay-rod 8 having its ends loosely mounted in the beams at the ends of the gang and restrained against detachment from the beams by a nut or other convenient stop 9. Fitted around the said stay-rod between each pair of cultivator beams is a coiled spring 10 which has its ends bearing against said beams to normally hold the beams parallel with each other and at a right angle to the rock shaft. Secured to the rock shaft at an intermediate point of its length is a rearwardly extending arm 11 which is connected by a chain, or its equivalent, 12, with the rearwardly extending crank arm 13 of a controlling lever 14 which is loosely mounted upon a fulcrum rod or beam 15 secured upon or forming a part of the supporting frame. A holding segment 16 is fixed upon this beam or rod 15 adjacent the lever and a latch 17 mounted upon the lever is adapted to engage the said segment so as to hold the lever in a set position.

It is thought the operation of my improved cultivator will be readily understood. As the machine is drawn over the field the gang of cultivator teeth will take into the earth and turn the loose surface soil onto the roots of the plants. Should any one tooth tend to ride over a plant owing to the plant being out of line with adjacent plants, the engagement of the tooth with the plant will cause the tooth to turn aside and pass around the plant, this action being permissible by reason of the pivotal connection of the beam with the head or rock shaft 3, as will be understood on reference to Fig. 2, in which one of the beams is shown deflected laterally. When the beam is thus shifted laterally, the spring at that side toward which the beam swings will be compressed and as soon as the plant has been cleared the spring will expand and return the beam to its normal position. Should it be desired to move the machine from one field to another, the lever 14 is manipulated so as to rock the head or shaft 3 and thereby lift the gang of cultivators from the ground, so that the machine may be drawn over a road, as will be readily understood.

It will be seen at once that my improved cultivator is exceedingly simple in its construction and that the several beams will automatically independently adjust themselves to the position of the plants, and, after the plants have been cleared, will automatically return to the normal position. The cultivator tooth or shovel may be of any well known or preferred construction and the device will be found exceedingly advantageous in cultivating fields, such as alfalfa fields, in which the seed is sown broadcast. The machine will be found desirable in localities where the rain fall is slight and artificial irrigation is employed as it may be used frequently without fear of harming the young plants and the soil, consequently, kept in a loose condition to receive and hold moisture.

What I claim is:—

1. The combination of a head, a plurality of cultivators extending rearwardly from the said head normally in parallel relation and independently attached to said head by vertical pivots, a retaining rod loosely mounted in and extending transversely through the several cultivators in rear of said head, and springs coiled around said rod between and bearing against adjacent cultivators.

2. A cultivator comprising a rock shaft, a plurality of couplings independently connected to the said rock shaft by vertical pivots and extending rearwardly therefrom, cultivator beams secured rigidly to the respective couplings and normally in parallel relation, a retaining rod extending transversely through the beams in rear of the couplings, springs coiled around the retaining rod between and bearing against adjacent beams, and means for oscillating the rock shaft.

In testimony whereof I affix my signature in presence of two witnesses.

CHARLES S. CORKHILL. [L. S.]

Witnesses:
    ARCHIE D. MITCHELL,
    GEO. A. MCCREA.